(12) United States Patent
Han et al.

(10) Patent No.: US 10,657,704 B1
(45) Date of Patent: *May 19, 2020

(54) MARKER BASED TRACKING

(71) Applicant: Facebook Technologies, LLC, Menlo Park, CA (US)

(72) Inventors: Shangchen Han, Kirkland, WA (US); Christopher David Twigg, San Anselmo, CA (US); Robert Y. Wang, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/781,575

(22) Filed: Feb. 4, 2020

Related U.S. Application Data (63) Continuation of application No. 16/177,054, filed on Oct. 31, 2018, now Pat. No. 10,593,101.

(60) Provisional application No. 62/580,358, filed on Nov. 1, 2017.

(51) Int. Cl.
| | |
|---|---|
| *G06T 19/20* | (2011.01) |
| *G06T 7/55* | (2017.01) |
| *G06N 3/08* | (2006.01) |
| *G06T 15/20* | (2011.01) |
| *G06T 17/10* | (2006.01) |
| *G06F 3/01* | (2006.01) |
| *G06T 19/00* | (2011.01) |

(52) U.S. Cl.
CPC ............ *G06T 15/205* (2013.01); *G06F 3/014* (2013.01); *G06N 3/08* (2013.01); *G06T 7/55* (2017.01); *G06T 17/10* (2013.01); *G06T 19/003* (2013.01); *G06T 19/20* (2013.01)

(58) Field of Classification Search
CPC ................................. G06T 15/205; G06T 7/55
See application file for complete search history.

(56) References Cited

U.S. PATENT DOCUMENTS

| | | | | |
|---|---|---|---|---|
| 9,857,971 | B2* | 1/2018 | Chang | G06F 3/0426 |
| 10,467,548 | B2* | 11/2019 | Wang | H04L 63/0861 |
| 2004/0034505 | A1* | 2/2004 | Kimble | G06F 3/014 |
| | | | | 702/182 |
| 2013/0082922 | A1* | 4/2013 | Miller | G06F 3/017 |
| | | | | 345/156 |
| 2013/0236089 | A1* | 9/2013 | Litvak | G06K 9/00382 |
| | | | | 382/154 |
| 2014/0364212 | A1* | 12/2014 | Osman | A63F 13/213 |
| | | | | 463/31 |

(Continued)

*Primary Examiner* — Jitesh Patel
(74) *Attorney, Agent, or Firm* — Fenwick & West LLP

(57) ABSTRACT

A tracking system converts images to a set of points in 3D space. The images are of a wearable item that includes markers, and the set of points include representations of the markers. A view is selected from a plurality of views using the set of points, and the selected view includes one or more representations of the representations. A depth map is generated based on the selected view and the set of points, and the depth map includes the one or more representations. A neural network maps labels to the one or more representations in the depth map using a model of a portion of a body that wears the wearable item. A joint parameter is determined using the mapped labels. The model is updated with the joint parameter, and content provided to a user of the wearable item is based in part on the updated model.

20 Claims, 5 Drawing Sheets

(56) References Cited

U.S. PATENT DOCUMENTS

| | | | |
|---|---|---|---|
| 2016/0120437 A1* | 5/2016 | Graham | A61B 5/055 |
| | | | 600/411 |
| 2016/0174897 A1* | 6/2016 | Sherman | A61B 5/6806 |
| | | | 600/476 |
| 2016/0242623 A1* | 8/2016 | Pasini | A61B 90/36 |
| 2017/0249745 A1* | 8/2017 | Fiala | G06T 7/246 |
| 2017/0309021 A1* | 10/2017 | Barnes | G06T 7/0012 |
| 2018/0070875 A1* | 3/2018 | Kshetrapal | G16H 30/40 |
| 2018/0075659 A1* | 3/2018 | Browy | G06F 3/011 |
| 2018/0114124 A1* | 4/2018 | Cronn | G06F 1/1684 |
| 2018/0345491 A1* | 12/2018 | Iwamoto | B25J 13/02 |

\* cited by examiner

MARKER BASED TRACKING

CROSS REFERENCE TO RELATED APPLICATIONS

This application is a continuation of co-pending U.S. application Ser. No. 16/177,054, filed Oct. 31, 2018, which claims priority to U.S. Application No. 62/580,358, filed Nov. 1, 2017, each of which is incorporated herein by reference in its entirety.

BACKGROUND

The present disclosure generally relates to motion capture, and specifically, to marker based, real-time tracking.

Virtual reality (VR) is a simulated environment created by computer technology and presented to a user through a VR system. In some VR systems, a user may interact with the virtual world around him using his hands and fingers (e.g., gestures). In these situations, the virtual VR system detects the user's hands and tracks them through time such that movement of the user's hands and figures are mapped to the user's movements in a virtual environment. However, conventional motion capture systems are unable to efficiently and automatically map in real-time the movement of markers associated with a user's limbs, to the movements of models or avatars in a VR or AR environment.

Moreover, in conventional marker based capture for film/television production, assignment and re-assignment of markers is a tedious process. For these systems an actor wears a suit that has various markers located on it. But, automatic assignment of markers generally can only occur if the actor is in a specific pose (e.g., stand up straight with arms out to form a T). Accordingly, if during filming the system loses track of a marker (which happens often), it is not able to automatically re-assign the marker unless filming is stopped and the actor assumes the specific pose. As it is not efficient to stop filming every time assignment of a marker is lost, the re-assignment of markers is usually done during post production by people who manually re-assign markers that were lost during the filming.

SUMMARY

The present disclosure generally relates to a tracking system. The tracking system uses markers that are coupled to a wearable item to track movement of a portion of a body of a user that wears the item. In some embodiments, the wearable item is a glove, and the portion of body is a hand of the user.

In some embodiments, the system performs a method for tracking a wearable item. In some embodiments, the method may be steps stored on a computer-readable medium. The method converts images to a set of points in 3D space. The images are of a wearable item that includes markers, and the set of points in 3D space include representations of the markers. The system selects a view from a plurality of views using the set of points. The selected view includes one or more representations of the representations. The system generates a depth map based on the selected view and the set of points, wherein the depth map includes the one or more representations. The system maps, via a neural network, labels to the one or more representations in the depth map using a model of a portion of a body that wears the wearable item. The system determines a joint parameter using the mapped labels. The system updates the model with the joint parameter. And content provided to a user of the wearable item is based in part on the updated model.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a HMD connected to a host computer system, a standalone HMD, a mobile device or computing system, or any other hardware platform capable of providing artificial reality content to one or more viewers.

System Overview

A marker-based hand motion capture system configured to track a wearable item to track movement of a portion of a body of a user that wears the item. In some embodiments, the wearable item is a glove, and the portion of body is a hand of the user.

Figure 1:
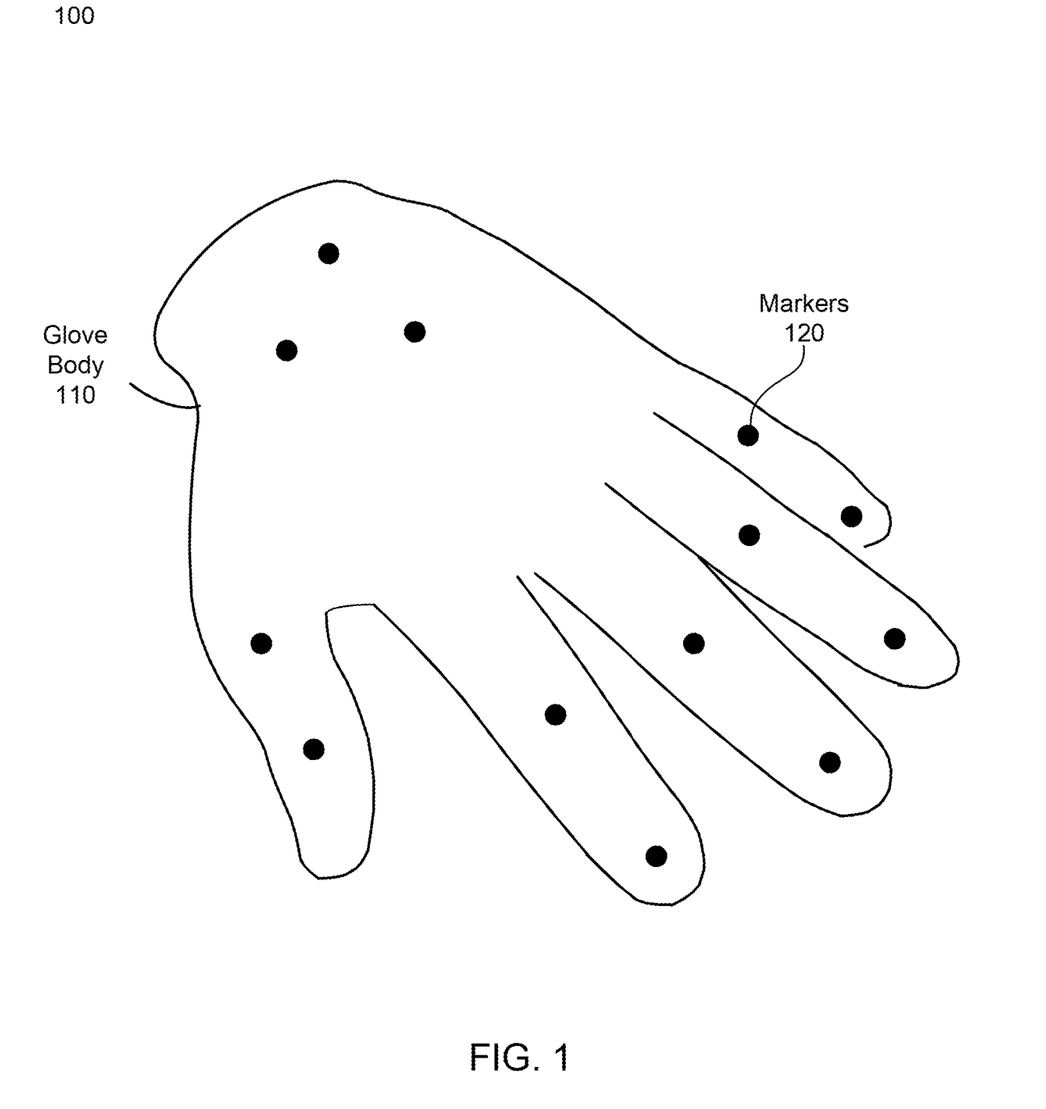
FIG. 1 is an isometric view of a glove to enable maker-based tracking, in accordance with an embodiment.

FIG. 1 is an isometric view 100 of a glove for marker-based tracking, in accordance with an embodiment. The glove comprises a glove body 110, and one or more markers 120 are coupled to the glove body 110.

The glove depicted in FIG. 1 represents a glove worn by a user that provides inputs to an artificial reality system. In various embodiments, the glove body 110 comprises an elastomer substrate (e.g., a flexible fiber or other flexible material such as rubber) configured to bend and/or flex with the user as the user interacts with a virtual object. For example, if the user grabs a virtual apple in a VR environment, the glove body 110 is configured to deform in conjunction with the user's hand in order to mimic a "grabbing" action. In various embodiments, the user perform one or more actions (e.g., gestures) to interact with the VR system. For example, the user may perform a "wave," a "pinch," or the action to interact with one or more items in the VR system.

The glove body 110 is coupled to one or more markers 120. In an embodiment, each of the one or more markers 120 is a passive locator. The passive locator is a reflective object located in a specific position on the glove body 110. In an embodiment a passive locator is located on the part of the glove body 110 associated with the each of the user's knuckles, or any other part of the hand which is tracked. Each passive locator has a reflectance type. Here, a reflectance type of a passive locator characterizes a band of light (e.g., a range of wavelengths of light) reflected by a passive locator comprising a marker 120. In one or more example embodiments, a passive locator has a reflectance type indicating that the passive locator reflects light in the visible band (380 nm to 750 nm), infrared (IR) band (750 nm to 1 mm), the ultraviolet band (10 nm to 380 nm), in some other portion of the electromagnetic spectrum, or some combination thereof. In still other embodiments, each of the markers of the one or markers 120 is an active locator (e.g., light emitting diode (LED)). In embodiments, where the markers are active locators, a reflectance type of the marker indicates the wavelength of light emitted by the illumination source. For example, an illumination source is an LED configured to emit light in one of a visible band, an IR band, the ultraviolet band, some other portion of the electromagnetic spectrum, or some combination thereof. In other embodiment, a reflectance type associated with an active locator includes a rate of modulation. For example, in embodiments where the active locator is an LED configured to blink, a reflectance type associated with the active locator a rate at which the LED blinks.

In an embodiment, each of the one or more markers 120 is associated with a distinct location on the glove body 110. In one or more embodiments, each of the one or more markers 120 are placed in locations on glove body 110 which correspond to joints on the hand. Example joints in a hand include a wrist and joints associated with each finger such as a metacarpophalangeal joint (MCP), a proximal interphalangeal joint (PIP), and a distal interphalangeal joint (DIP). In other embodiments, the one or more markers 120 may be placed on any location of the hand that needs to be tracked. In the embodiment illustrated in FIG. 1, the marker has been placed on the glove body 110 associated with joints on the pinky, the ring finger, the middle finger, the index finger, and the user's thumb. In some example embodiments, the one or more markers 120 may be placed on locations on the glove body 110 not associated with a joint or a part of the hand being tracked (e.g., wrist, knuckle, and back of palm). For example, in FIG. 1 three markers are placed on the back of the glove body 110.

Each of the one or more markers 120 may be arranged into a marker group. The marker group is associated with a distinct location on the glove body 110 and a reflectance configuration. The reflectance configuration of a marker group describes a spatial configuration (a number, a wavelength, a modulation, and an arrangement of the one or more markers in a marker group). For example, a marker group may comprise markers arranged in a triangle, an inverted triangle, a right triangle, a diamond, a vertical line, a horizontal line, or some other arrangement. In the embodiment depicted in conjunction with FIG. 1, a marker group comprising three individual markers arranged into a triangle is located on the part of the glove body 110 that corresponds to the back of the user's hand. Each of the individual markers comprising a marker group may have a common reflectance type or a different reflectance type. For example, in an embodiment where all the markers in a marker group have a common reflectance type, each of the markers in the marker group reflects or emits the same wavelength of light. Alternatively, each of the markers in a marker group may comprise different reflectance type. That is, each of markers in a marker group reflect or emit a different wavelength of light (e.g., ultraviolet, visible, IR). In one or more embodiments, each of the markers comprising a marker group may also have a different modulation (e.g., blink at a different rate or change their color). The relative location of each of the one or more markers 120 may be used to determine joint parameters (e.g., joint angles and joint location).

Figure 2:
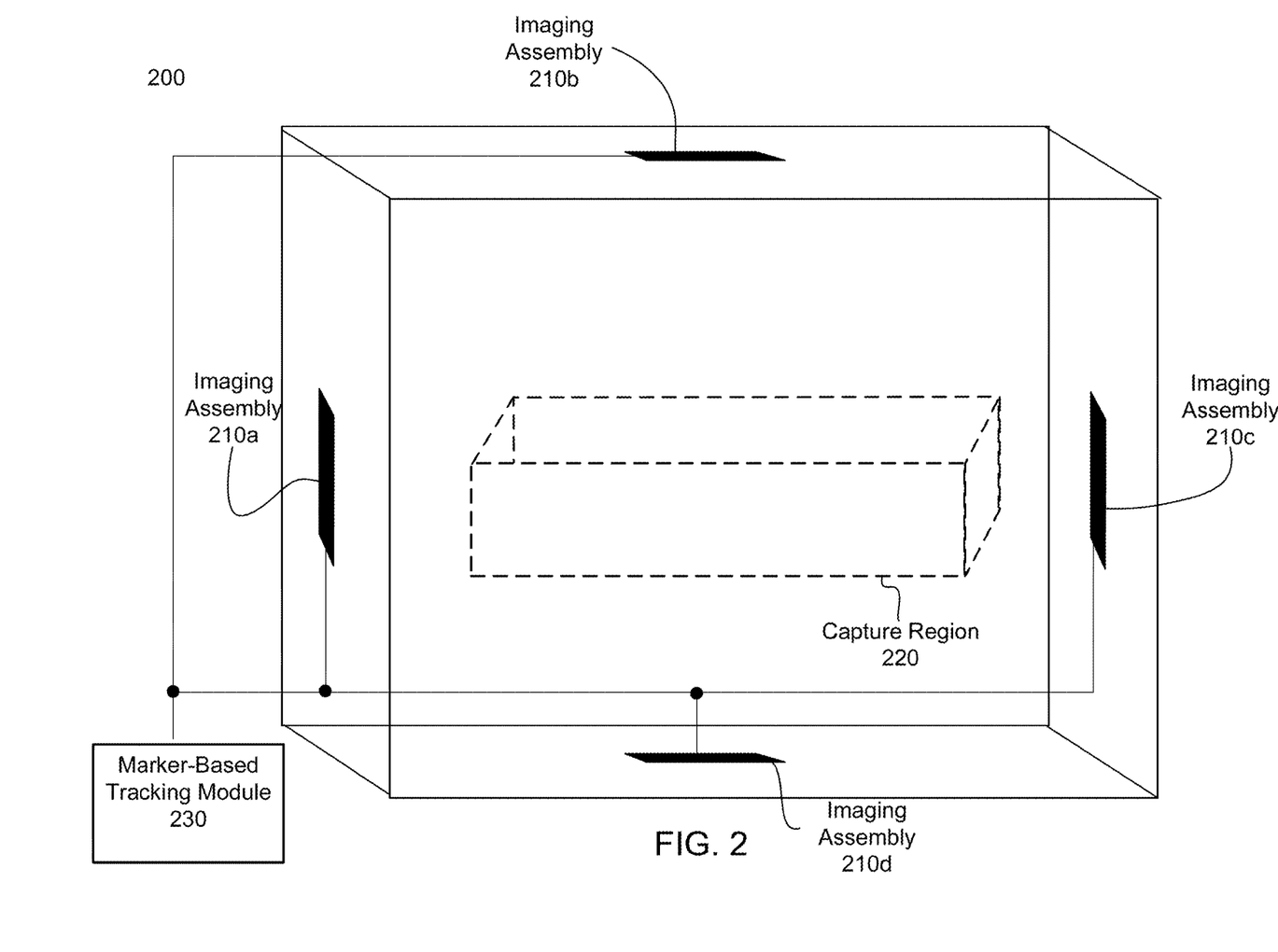
FIG. 2 is a multi-camera imaging system for marker-based tracking, in accordance with an embodiment.

FIG. 2 is an example multi-camera imaging system 200 for marker-based tracking, in accordance with an embodiment. The multi-camera imaging system 200 may also be referred to as a motion capture system. In the embodiment depicted in FIG. 2, the multi-camera imaging system 200 includes four imaging assemblies 210a-d (i.e., imaging assembly 210a, imaging assembly 210b, imaging assembly 210c, and imaging assembly 210d), a capture region 220, and a marker-based tracking module 230. In an embodiment, each of the imaging assemblies 210a-d includes two or more charge coupled device (CCD) camera or two or more complimentary metal gate oxide semiconductor (CMOS) camera. In the embodiment described above, one or more of the CCD or CMOS cameras are Infrared cameras configured to capture light in the visible part of the electromagnetic spectrum. Alternatively, or additionally, the one or more of the CCD or CMOS cameras are Red, Green, Blue, Infrared (RGBI) cameras and are configured to capture light in the visible and infrared part of the electromagnetic spectrum. In other embodiments, the cameras are additionally or alternatively configured to capture light in the ultraviolet part and the visible part of the electromagnetic spectrum. In still other embodiments, the cameras are configured such that at least one of the two or more cameras captures light in a different part of the electromagnetic spectrum than the other. For example, an imaging assembly 210a includes two cameras where one captures light in the visible part of the spectrum while the other captures light in the infrared part of the electromagnetic spectrum.

Each of the one or more imaging assemblies 210a-d are directed towards the capture region 220 from a different direction such that each of the imaging assemblies 210a-d has a different perspective of the capture region 220. The capture region 220 is a region in space to capture images of a wearable item worn by the user (e.g., gloves on a user's hands). In one or more example embodiments, a user places their hands in the capture region 220 and the one or more imaging assemblies 210a-d capture one or more images of the user's hand in response to one or more instructions from the marker based tracking module 230. In other embodiments, the multi-camera imaging system 200 includes more or fewer imaging assemblies 210a-d than those depicted in the embodiment shown in FIG. 2. In some embodiments, at least one imaging device of the multi-camera system 200 is located on a head mounted display (HMD) and/or a near-eye display (NED).

Each of the one or more imaging assemblies 210a-d includes one or more cameras capable of determining 2D information about an incident scene (e.g., capture region 220). Generally, the imaging assemblies 210a-d include one or more cameras, one or more video cameras, or any other device capable of capturing images of the capture region 220. The imaging assembly 210a-d capture two-dimensional (2D) information about a pixel's location. The imaging assemblies 210a-d are configured to capture images of the capture region 220 in one or more bands of light (e.g., range of wavelengths of light). The bands of light may include, e.g., a visible band (~380 nm to 750 nm), an infrared (IR) band (~750 nm to 1 mm), an ultraviolet band (10 nm to 380 nm), another portion of the electromagnetic spectrum that the imaging assemblies 210a-d are configured to detect, or some combination thereof.

In some embodiments, each of the imaging assemblies 210a-d is a depth camera. A depth camera captures three-dimensional (3D) information about a pixel's location and distance from the sensor. The depth camera may include a light sensor, a structured light (e.g., infrared) emitter, and a controller. The structured light emitter projects a light pattern into the capture region 220, and onto the wearable item worn by the user within the capture region. In various embodiments, the projected light pattern includes a speckle pattern or one or more structured light elements. The light (e.g., infrared) sensor is pointed at the capture region, and captures the projected light pattern on the user's hand. The controller controls the operations of the light sensor and structured light emitter. The controller is further configured to generate depth image data based on input from the light sensor.

In an example embodiment, the two cameras associated with an imaging assembly (e.g., imaging assemblies 210a-d) are placed a set distance apart and configured to capture a 3D image of capture region 220. In the previous example, the two cameras compare the information about the incident scene (e.g., capture region 220) to extract 3D information about objects in the capture region 220 from the relative positions of the one or more markers 120. In still other embodiments, an RGB camera is configured such that a color image data from the camera is cross referenced to more reliably determine the 3D location of hand features (e.g., joint parameters).

In one or more embodiments, the one or more imaging assemblies 210a-d are synchronized to each other (e.g., timestamps, or a shared clock). The one or more imaging assemblies 210a-d are synchronized to capture an image of the objects in the capture region 220 (e.g., a glove body 110). Here, each of the imaging assemblies 210a-d captures an image of the capture region 220 from a different point of view (e.g., left, right, top, and down). In the example embodiment depicted in FIG. 2, imaging assembly 210a, imaging assembly 210b, imaging assembly 210c, and imaging assembly 210d capture an image of the capture region 220 from the left, top, right, and bottom directions, respectively.

The imaging assemblies 210a-d capture one or more images of capture region 220 from a variety of perspectives. For example, if a user's hand wearing a glove is in the capture region 220, the one or more imaging assemblies are configured to capture images of the glove in a variety of different positions, poses, and orientations. Each imaging assembly of the one or more imaging assemblies 210a-d captures a portion of the glove including one or more hand features. Hand features (e.g., digits, palm, and any combination thereof) captured across multiple images are used to determine one or more joint parameters while a hand is in a particular pose. A hand pose is defined by a particular state of the use's hand. That is, hand poses include the shape of the hand while the user performs an action in a virtual environment (e.g., grabbing an object, holding an object, pressing a button) or a specific gesture (e.g. a thumbs up, a peace sign, holding a baseball). In given pose, the one or more imaging assemblies 210a-d capture hand features across multiple images from several perspectives. The captured images are analyzed to determine the relative positions between one or more markers associated with the user's hand (e.g., markers 120). The positions of one or more markers is used to determine one or more joint parameters (e.g., a joint location and an angle) for each of the joints associated with a hand model using, for instance, the process of inverse kinematics optimization. Analyzing captured images to determine a distance between one or more observed markers is further discussed below in conjunction with FIG. 3.

Figure 3:
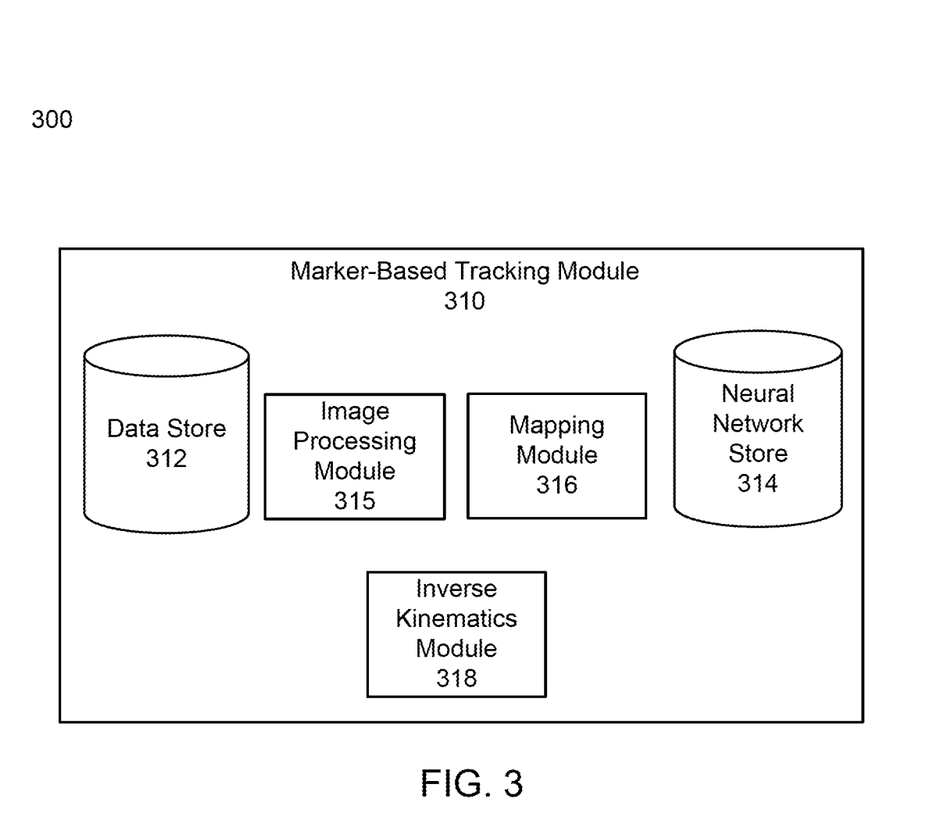
FIG. 3 is a block diagram of a marker-based tracking module depicted in FIG. 2, in accordance with an embodiment.

FIG. 3 is a block diagram 300 of a marker-based module 310 in accordance with an embodiment. The marker-based tracking module 230 is an embodiment of the marker-based tracking module 310. The maker-based tracking module 230 is configured to track a wearable item to track movement of a portion of a body of a user that wears the item. In some embodiments, the wearable item is a glove, and the portion of body is a hand of the user. The marker-based tracking module 310 comprises a data store 312, a neural network store 314, an image processing module 315, a mapping module 316, and an inverse kinematics module 318. In other embodiments, the marker-based tracking module 310 comprises additional or fewer modules than those described herein. Similarly, the functions can be distributed among the modules in a different manner than is described here.

The marker-based tracking module 310 is configured to provide one or more instructions to one or more imager assemblies (e.g., imager assemblies 210a-d). In some embodiments, the instructions synchronize each of the one or more imager assemblies. In still other embodiments, the marker-based tracking module 310 provides instructions to active locators associated with a wearable item (e.g., glove body 110) to module a modulation rate. The marker-based tracking module 310 may alternatively or additionally receive instructions from a console associated with an HMD system (e.g., console 530). In an embodiment, the marker-based tracking module 310 stores the received instructions in an instruction store. The marker-based tracking module 310 is configured to transmit the stored instructions to each of the one or more imaging assemblies.

The marker-based tracking module 310 may be configured to transmit a determined pose calibrated hand model to a console associated with the HMD (e.g., console 530). In some embodiments, marker-based tracking module 310 stores a mapping between one or more poses associated and an action being performed by a user in a virtual environment. For example, poses that might be mapped to actions include distinctive and/or useful gestures such as a finger point, a thumbs up, a piece sign.

The data store 312 stores one or more models of parts of body (e.g., the hand). In some embodiments, a stored model (e.g., a hand model) in the data store 310 comprises a small of group of articulated rigid links where the rigid bodies represent the bones of the digits, the palm, and sometimes the forearm. Typically, each rigid body is represented by a cylinder with a defined diameter and length. Both ends of the cylinder associated with a given rigid body are linked to an adjacent rigid body such that the two adjacent rigid bodies are capable of some amount angular rotation with respect to each other. The linkages represent parts of the hand such as the wrist and the knuckle. As described herein linkages between two rigid bodies in a hand model are denoted as joints. In various embodiments, the model stored is a hand model describes 16 joints and 16 rigid bodies. Each of the 16 joints is parameterized by an orientation and a position. The 16 rigid bodies are parameterized by a diameter and length. Together this collection of linked rigid bodies represents a geometric model of the user's hand including the wrist and sometimes the forearm.

Each of the joints in the hand model is associated with one or more degree of freedom (DOF). For example, the joint representing the wrist includes two degrees of freedom (e.g., pitch and yaw). In another example, the hand joints (e.g., knuckles) each include two degrees of freedom (e.g., roll and yaw). In yet another example, each finger joint includes one degrees of freedom (e.g., yaw). DOFs may include rotational or translational degrees of freedom. In one or more embodiments, each DOF is associated with a range of values, such as may be defined by a maximum value and a minimum value, representing how much a joint can move along the degree of freedom. Generally, minimizing the DOFs associated with the joints can be helpful in various ways (e.g., limiting the solution space).

The values of the model parameters associated with a given model are stored within the data store 210. In some embodiments, the model and the model parameters are stored in the data store 312 as a <key, value> pair. In other embodiments, the data store 312 stores multiple values associated with a single key. For example, the key is a joint (e.g., a knuckle or wrist) associated with the hand model and the value is one or more of a degree of rotation, an angle, a DOF, and a position associated with the joint. In other embodiments, keys stored in model store 312 are rigid bodies associated with the model (e.g., digits) and values stored in the model store 312 are one or more of a diameter of rigid body, a length of a rigid body, a position of a joint, the reference locations of the markers on the body part (e.g., the hand), the 3D geometric mesh of the body part, the 3D geometric volume occupied by the body part, some other parameter associated with the model, or some combination thereof. In other embodiments, the data store 312 additionally stores other parameters associated with the model.

The neural network store 314 stores one or more neural networks models which define algorithmic relationships between image data and marker identities associated with a hand model. In various embodiments, inputs to the neural networks model is image data. The output of the stored neural network model is the locations of each specific marker and/or representation of marker associated with the model. The stored neural networks may also be configured to output an angle between each of the one or more joints directly. Convolutional neural networks may be described mathematically as a convolution operation and are generally invariant to translation of the input image. In an embodiment, the stored neural network model may be retrieved from a console (e.g., console 530).

In other embodiments, the neural network store 314 stores training data and is configured to generate a neural network model from the stored training data. In these embodiments, the training data comprises one or more training data sets. The training data sets include image data including images of hands, and ground truth outputs defining locations of hand features or marker locations within the images. The training data may include training data of body parts. For example, the body parts may be, e.g., fingers and hands of various sizes and shapes spanning the variation of hands in the human population. The training data sets may include two-dimensional or three-dimensional image data from one or more imaging assemblies. Typically, a training data set represents a collection of inputs and ground truth outputs that are used to train a neural network model. In an example embodiment, a neural network may be generated by applying the stored one or more training data sets to a convolutional neural network.

The image processing module 315 receives one or more images from the one or more imaging assemblies (i.e., imaging assemblies 210a-d). The images are different views of a wearable item (e.g., a glove) that includes markers. In one or more embodiments, the received images comprise a set of 3D points associated with the markers from each of the one or more imaging assemblies (e.g., imaging assemblies 210a-d) and the set of 3D points includes representations of the markers. A representation of a marker may be, e.g., a sphere, or some other shape. In other embodiments, the image processing module 315 converts the images to a set of points in 3D space, and the set of points in 3D space include representations of the markers.

The image processing module 315 is configured to select a view from a plurality of views using the set of points in 3D space. The selected view includes one or more representations of the representations of the markers. The image processing module 315 selects the view using a synthetic camera. The synthetic camera has a field of view. In some embodiments, a size of the field of view is fixed, alternatively, it may be adjusted by the image processing module 315. The image processing module 315 determines an orientation of the synthetic camera relative to the set of points that includes at least a threshold number of representations. Note in some embodiments, the orientation may not correspond to an orientation of any of the imaging assemblies 210a-210d. For example, the imaging assemblies 210a-210d each have a different field of view than any of a plurality of views of the synthetic camera. In some embodiments, the image processing module 315 determines the orientation that includes a maximum number of representations for the field of view of the synthetic camera. In other embodiments, the image processing module 315 determines the orientation that includes at least 3 representations for the field of view of the synthetic camera. In some embodiments, the image processing module 315 determines the orientation with a largest distance between the representations for the field of view of the synthetic camera. The image processing module 315 generates the view based on the determined orientation and the field of view of the synthetic camera.

In some embodiments, the image processing module 315 rasterizes the set of 3D points to isolate an image of the hand from the synthetic camera. That is, the image processing module 315 converts the received stream of 3D marker points into a set of pixels or dots suitable for further image processing. In one or more embodiments, rasterization includes projecting the 3D locations of the markers into 2D locations and depth, with respect to the virtual camera. The depth value is splatted at the 2D location in the image as a dot, a filled circle, or other shape.

The image processing module 315 generates a depth map based on the selected view and the set of points. The generated depth map includes the one or more representations. In some embodiments, the image processing module 315 generates the depth map based on the rasterized stream of 3D points by encoding each pixel in a 2D scene with depth information. In some embodiments, the generated depth map is based on the selected view. Alternatively, the image processing module 315 may generate a depth map for each of the plurality of views. In some embodiments, the generated depth map is a sparse 2D depth map. A generated depth map indicates distances of objects captured in the image from a point of view of the synthetic camera. A depth map includes pixels (e.g., distinct points) supplemented with depth information. In various embodiments, the depth map is a two-dimensional (2D) image of a portion of the 3D scene captured by the imaging assemblies and depth information is encoded in distinct levels. For example, in a depth map where depth information in encoded in 256 levels of grayscale tonal change as a function of depth, pixels representing closer objects are brighter than pixels representing further away objects. In alternate embodiments, different schemes may be utilized to represent depth information. For example, the image processing module 315 uses more than 256 or fewer than 256 levels to denote depth information.

The mapping module 316 maps, via a neural network, labels to the one or more representations in the depth map using a model of a portion of a body that wears the wearable item. The mapping module 316 obtains and/or receives the depth map from the image processing module 315, the stored model from the data store 312, and a neural network (e.g., convolutional neural network) from the neural network store 314. The mapping module 316 maps positions of joints described in the model to image space positions using the neural network. The mapping module 316 matches the image space positions of the joints to image space positions of the markers. In some embodiments, the matching of the image space positions of the joints to the image space positions of the markers is done using minimum-cost bipartite matching.

In some embodiments, this mapping may be produced by: determining a normalized depth map of a user's body part (e.g., hand) at different scales; and performing a set of: convolutions, max pooling operations, and a number of nonlinear transformations. Once the locations of the representations on the model are determined, labeling the original marker points may be performed through nearest neighbor matching.

The mapping module 316 labels the matched positions of the joints. A label (e.g., wrist, metacarpophalangeal joint, proximal interphalangeal joint, and distal interphalangeal joint) associated with a model correlates to a joint associated with the model, a representation of a marker associated with a label is referred to, herein, as a labeled representation, and a marker associated with a label is referred to, herein, as a labeled marker.

The inverse kinematics module 318 determines one or more joint parameters based on solutions to kinematics equations based on the labeled markers. The inverse kinematics module 318 receives labeled representations and/or labeled markers from the mapping module 316 and relies on kinematics equations to determine the joint parameters (e.g., joint angle and joint position) based on the one or label markers. Each joint of the set of joints associated with a given hand model are associated with one or more constraints. In various embodiments, the constraint associated with a joint is a function of the DOF associated with the joint. In the embodiments described above, the movement of one rigid body in a hand model is associated with the computation of the one or more joint parameters (i.e., joint angle) for each of the other joints in the hand model to maintain joint constraints. In various embodiments, the inverse kinematics module 318 relies on various iterative optimization techniques to determine the one or more joint parameters based on the labeled markers. In an example embodiment, the inverse kinematics module 318 models one or more forward kinematics equations associated with a hand model as a Taylor series expansion and then inverts the resulting kinematics equations based on the positions of the labeled markers. In another embodiment, the forward kinematics equations may be inverted using a derivative free method (e.g., particle swarm). The inverse kinematics module 318 updates the model with the one or more joint parameters. An HMD and or NED may provide content to a user of the wearable item (e.g., the glove) based in part on the updated model.

Note that certain movements of the wearable item may mask the markers and cause a loss of assignment of one or more markers (i.e., the marker-based tracking module 310 may not have the marker paired with a part of the model). In conventional tracking systems, re-assignment of the marker is obtained by moving to a particular pose. However, this is not efficient as it basically stops a user's ability to interact within the artificial reality environment until the marker is re-assigned. In contrast, the marker-based tracking module 310 described above is able to automatically assign and re-assign markers without prompting a user to take a particular pose.

Moreover, the marker-based tracking module 310 can track a much larger number of markers than conventional tacking systems.

Real-Time Hand Motion Capture

Figure 4:
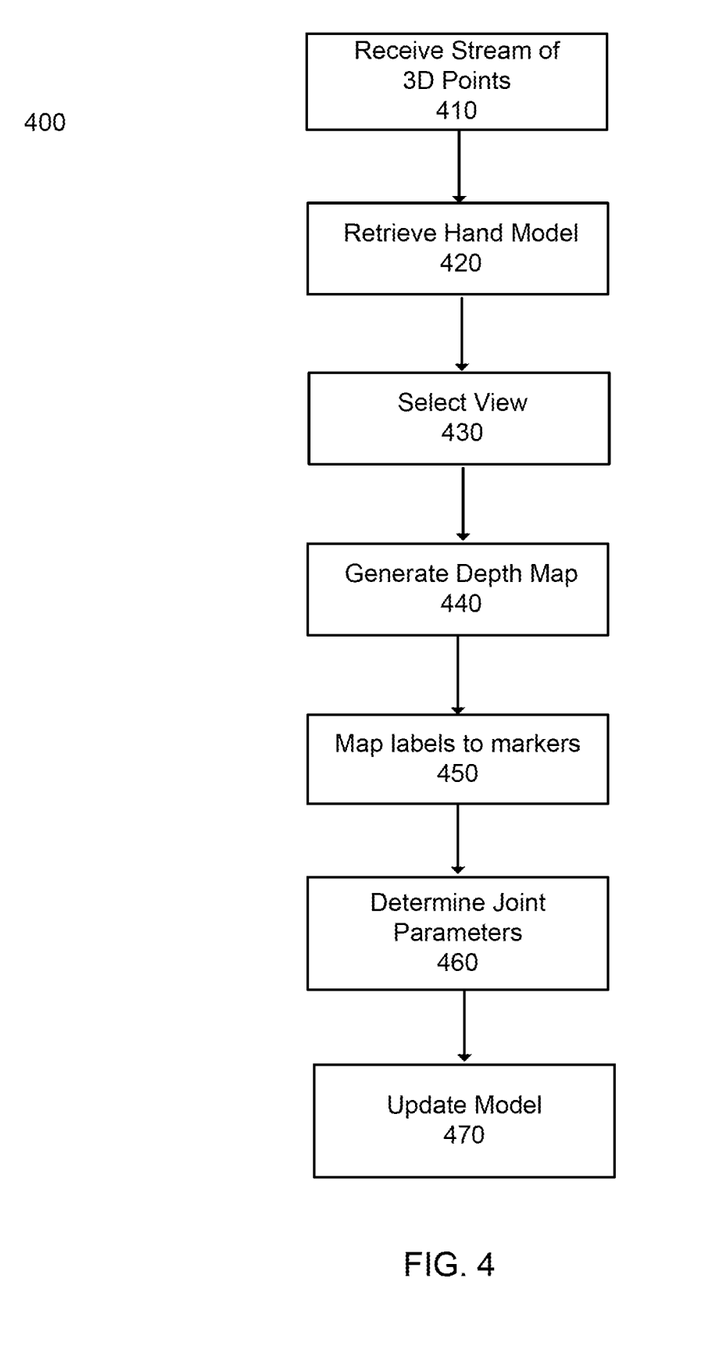
FIG. 4 is a flow chart of an example process for performing real-time hand motion capture in accordance with an embodiment.

FIG. 4 is a flow chart of an example process 400 for performing real-time hand motion capture in accordance with an embodiment. The process 400 illustrated in conjunction with FIG. 4 may be performed by the marker-based tracking module 310. In other embodiments, the process 400 may be performed by different and/or additional modules.

The marker-based tracking module 310 receives 410 a stream of 3D points from the one or more imaging assemblies. In one or more embodiments, the one or more imaging assemblies are the one or more imaging assemblies 210a-d associated with the mutli-camera imaging system 200 described above in detail in conjunction with FIG. 2. In other embodiments, the multi-camera imaging system 200 is a single camera imaging system and includes a single imaging assembly which is pointed at a capture region (e.g., the capture region 220) where a wearable item worn by a user is located (e.g., a hand in a glove). In these embodiments, the imaging assembly generates a single stream of 3D points from a single perspective of the capture region (e.g., capture region). The stream of 3D points generated by the imaging assembly is from a single perspective, and thus may include lower quality information regarding hand shapes and poses than multiple perspective image data sets (e.g., depending on hand pose, position, hand feature occlusion, etc.). However, it is advantageous to use fewer cameras for tracking to reduce hardware costs, improve space efficiency, optimize resource utilization, etc. An embodiment of a single camera imaging system is further described below in conjunction with FIG. 5. In various embodiment, the marker-based tracking module 310 is configured to rasterize the received images into an approximate depth map of one or more objects (e.g., a user's hands) in a capture region (e.g., capture region 220).

The marker-based tracking module 310 retrieves 420 a model from a model store. In one or more embodiments, the model is stored locally in a model store associated with the marker-based tracking module 310 (e.g., data store 312). This embodiment is further described above in conjunction with FIG. 3. In other embodiments, the marker-based tracking module 310 retrieves a deformable model from a source external to the marker-based tracking module 310 (e.g., console 530). In the previous embodiment, the retrieved model is updated by the marker-based tracking module 310 based on the one or more depth images of a body part of the user (e.g., hand in a glove) captured by the multi-camera imaging system. In still other embodiments, the marker-based tracking module 310 is configured to generate a model based on the one or more received images of the user's body part The marker-based tracking module 310 selects 430 a view from a plurality of views using the set of points in 3D space. The selected view includes one or more representations of the representations of the markers. The marker-based tracking module 310 may determine an orientation of the synthetic camera relative to the set of points that includes, e.g., at least a threshold number of representations, a maximum number of representations, or a largest distances between representations.

The marker-based tracking module 310 generates 440 a depth map based on the selected view and the set of points. The depth map includes the one or more representations. The generated depth map is further described above in conjunction with FIG. 3.

The marker-based tracking module 310 maps 450 labels to the one or more representations in the depth map using a model of a portion of a body that wears the wearable item. The marker-based tracking module 310 maps the labels using a neural network (e.g., convolutional neural network). The marker-based tracking module 310 maps positions of joints described in the model to image space positions using the neural network. The marker-based tracking module 310 matches the image space positions of the joints to image space positions of the representations. The matching of the image space positions of the joints to the image space positions of the markers may be done using minimum-cost bipartite matching.

The marker-based tracking module 310 determines 460 a joint parameter using the mapped labels. The marker-based tracking module 310 uses kinematics equations to determine the joint parameters (e.g., joint angle and joint position) based on the mapped labels.

The marker-based tracking module 310 updates 470 the model with the joint parameter. A HMD and/or NED may provide content to a user of the wearable item based in part on the updated model.

HMD System Overview

Figure 5:
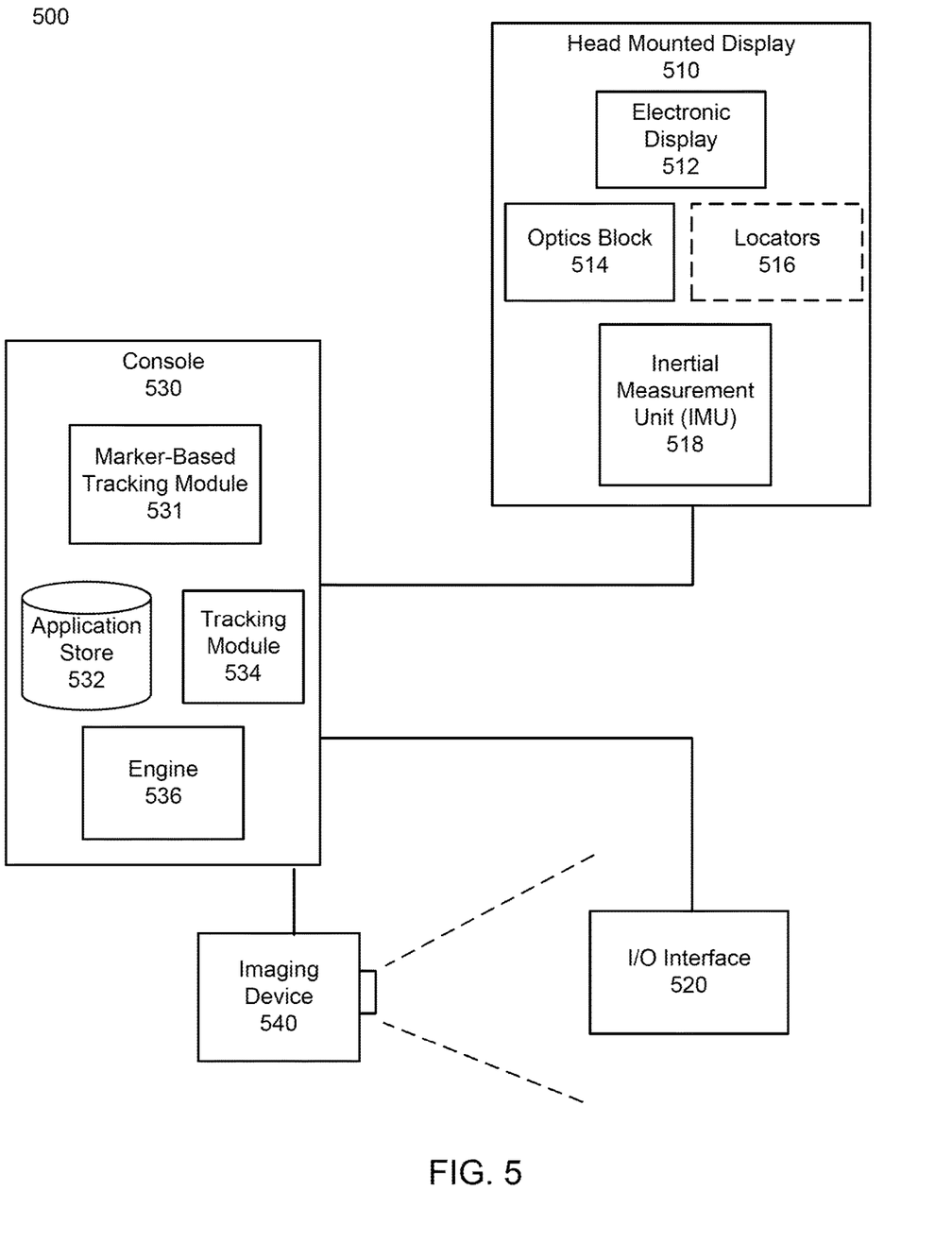
FIG. 5 is a block diagram of a head-mounted display system, in accordance with some embodiments.

FIG. 5 is a block diagram of a head-mounted display (HMD) system 500 in accordance some embodiment. The HMD system 500 operates in an artificial reality environment. The system 500 shown in FIG. 5 comprises a head-mounted display (HMD) 510, one or more imaging assembly 540, and an input/output (I/O) interface 140 that are each coupled to a console 530. While FIG. 5 shows an example system 500 including one HMD 510, one imaging device 540, and one I/O interface 520, in other embodiments, any number of these components are included in the system 500. For example, system 500 may include multiple HMDs 510 I/O interface 520 being monitored by one or more imaging assembly 540, with each HMD 510, I/O interface 520, and imaging device 540 communicating with the console 530. In alternative configurations, different and/or additional components may be included in the system 500.

The HMD 510 presents content to a user. Examples of content presented by the HMD 510 include one or more images, video, audio, or some combination thereof. In some embodiments, audio is presented via an external device (e.g., speakers and/or headphones) that receives audio information from the HMD 510, the console 530, or both, and presents audio data based on the audio information. Note, in alternate embodiments, the HMD 510 may be a near-eye display (NED).

The HMD 510 includes an electronic display 512, optics block 514, and an inertial measurement unit (IMU) 518. In some embodiments, the HMD 510 may also include one or more locators 516 and/or a depth camera assembly (e.g., to determine a distance to objects in a local area surrounding the HMD 510). In other embodiments, the HMD 510 includes additional or fewer elements than those described herein.

The electronic display 512 displays images to the user in accordance with data received from the console 530. In various embodiments, the electronic display 512 may comprise a single electronic display or multiple electronic displays (e.g., a display for each eye of a user). Examples of the electronic display 512 include: a liquid crystal display (LCD), an organic light emitting diode (OLED) display, an active-matrix organic light-emitting diode display (AMOLED), some other display, or some combination thereof.

The optics block 514 magnifies received image light from the electronic display 512, corrects optical errors associated with the image light, and presents the corrected image light to a user of the HMD 510. In an embodiment, the optics block 514 includes one or more optical elements and/or combinations of different optical elements. For example, an optical element is an aperture, a Fresnel lens, a convex lens, a concave lens, a filter, or any other suitable optical element that affects the image light emitted from the electronic display 512. In some embodiments, one or more of the optical elements in the optics block 514 may have one or more coatings, such as anti-reflective coatings.

Magnification of the image light by the optics block 514 allows the electronic display 512 to be physically smaller, weigh less, and consume less power than larger displays. Additionally, magnification may increase a field of view of the displayed content. For example, the field of view of the displayed content is such that the displayed content is presented using almost all (e.g., 110° diagonal), and in some cases all, of the user's instantaneous field of view. In some embodiments, the optics block 514 is designed so its effective focal length is larger than the spacing to the electronic display 512, which magnifies the image light projected by the electronic display 512. Additionally, in some embodiments, the amount of magnification may be adjusted by adding or removing optical elements.

The optics block 514 may be designed to correct one or more types of optical error. Examples of optical error include: distortion, chromatic aberration, spherical aberration, field curvature, astigmatism, or any other type of optical aberrations. In some embodiments, content provided to the electronic display 512 for display is pre-distorted, and the optics block 514 corrects the distortion when it receives image light from the electronic display 512 generated based on the content.

The one or more locators 516 may be located in fixed positions on the HMD 510. In various embodiments, each of the locators 516 emits light that is detectable by an external imaging device. In an embodiment, the one or more locators 516 are located within the IMU 518 and neither the IMU 518 nor the locators 516 are visible to the user.

In the embodiment described by FIG. 5, the IMU 518 includes one or more position sensors. In one or more embodiments, neither the IMU 518 nor the one or more position sensors are visible to a user of the HMD 510. The IMU 518 is an electronic device that generates IMU data based on measurement signals received from one or more of the position sensors. A position sensor generates one or more measurement signals in response to motion of the HMD 510. Examples of position sensors include: one or more accelerometers, one or more gyroscopes, one or more magnetometers, and another suitable type of sensor that detects motion, a type of sensor used for error correction of the IMU 518, or some combination thereof. The position sensors may be located external to the IMU 518, internal to the IMU 518, or some combination thereof.

The I/O interface 520 is a device that allows a user to send action requests to the console 530. An action request is a request to perform a particular action in the VR or AR system. The I/O interface 520 may include a wearable item (e.g., a glove) that includes a plurality of markers (e.g., as described above with regard to FIG. 1). For example, an action request may be to start or end an application or to perform a particular action within the application. Here actions may include, e.g., "making a first," "interacting with an application," or some other action performed by a user in an artificial reality environment.

The I/O interface 520 may also include one or more input devices. Example input devices include: a keyboard, a mouse, a game controller, an I/O interface 520, or any other suitable device for receiving action requests and communicating the received action requests to the console 530. An action request received by the I/O interface 520 is communicated to the console 530, which performs an action in the artificial reality system corresponding to the action request. In some embodiments, the I/O interface 520 may provide haptic feedback to the user in accordance with instructions received from the console 530. For example, haptic feedback is provided when an action request is received, or the console 530 communicates instructions to the I/O interface 520 causing the I/O interface 520 to generate haptic feedback when the console 530 performs an action.

The imaging device 540 captures images of wearable device worn by the user that is part of the I/O interface 520. The imaging device 540 may include a plurality of imaging assemblies as discussed above with reference to FIG. 2. The imaging device 540 is directed towards a capture region (e.g., capture region 220). In these embodiments, the plurality of imaging assemblies are configured to generate image data of a wearable item including a plurality of markers that is work by the user.

The console 530 provides content to the HMD 510 for presentation to the user in accordance with information received from one or more of: the imaging device 540, the HMD 510, and the I/O interface 520. In the example shown in FIG. 5, the console 530 includes a marker-based tracking module 531, an application store 532, a tracking module 534, and an engine 536. Some embodiments of the console 530 have different modules than those described in conjunction with FIG. 5. Similarly, the functions further described below may be distributed among components of the console 530 in a different manner than is described here.

The marker-based tracking module 531 tracks the wearable item that is part of the I/O interface 520. Based on the tracked wearable item, the marker-based tracking module 531 tracks movement of a portion of a body of a user that wears the item. In some embodiments, the wearable item is a glove, and the portion of body is a hand of the user. The marker-based tracking module 531 is an embodiment of the marker-based tracking module 310.

The application store 532 stores one or more applications for execution by the console 530. An application is a group of instructions, that when executed by a processor, generates content for presentation to the user. Content generated by an application may be in response to inputs received from the user via movement of the HMD 510 or the I/O interface 520. Examples of applications include: gaming applications, conferencing applications, video playback application, or other suitable applications.

The tracking module 534 tracks movements of the HMD 510. The tracking module 534 may track the HMD using, e.g., information from a DCA on the HMD 510, IMU data from the HMD 510, an external camera that captures images of locators 516 of the HMD, or some combination thereof. The tracking module 534 provides the tracked position of the HMD 510 to the engine 536.

The engine 536 executes applications within the system environment 500 based in part on the tracked position of the HMD 510. Based on the tracked position, the engine 555 determines content to provide to the HMD 510 for presentation to the user. For example, if the received information indicates that the user has looked to the left, the engine 536 generates content for the HMD 510 that mirrors the user's movement in a virtual environment. In one or more embodiments, the engine 536 renders a user's hand performing one or more actions in a virtual environment based on the model (e.g., of the hand) of the marker-based tracking module 531. One or more actions rendered by the engine 536 include interacting with an object in the virtual environment. For example, a user may pick up, throw, or otherwise manipulate an object. In other embodiments, the engine 536 renders a user's hand performing a gesture based on a received calibrated hand model (e.g., points, clapping, waving, etc.). In one or more embodiments, an action performed by the user's hand is rendered by the engine in a virtual environment in real-time based on the calibrated hand model.

Additionally, the engine 536 performs an action within an application executing on the console 530 in response to an action request received from the I/O interface 520 and provides feedback to the user that the action was performed. The provided feedback may be visual or audible feedback via the HMD 510 or haptic feedback via the I/O interface 520.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
    mapping of labels, via a neural network, to one or more representations in a depth map using a model of a portion of a body that wears a wearable item, wherein the wearable item includes the markers and the representations in the depth model are of the markers;
    determining a joint parameter using the mapped labels; and
    updating the model with the joint parameter, wherein content provided to a user of the wearable item is based in part on the updated model.

2. The method of claim 1, wherein the mapping of labels, via the neural network, to one or more representations in the depth map using the model, further comprises:
    mapping positions of joints described in the model to image space positions using the neural network;
    matching the image space positions of the joints to image space positions of the markers; and
    labeling the matched positions of the joints.

3. The method of claim 2, wherein the matching the image space positions of the joints to image space positions of the markers is done using minimum-cost bipartite matching.

4. The method of claim 1, comprising:
    converting images to a set of points in 3D space, wherein the images are of the wearable item, and the set of points in 3D space include representations of the markers;
    selecting a view from a plurality of views using the set of points, wherein the selected view includes one or more representations of the representations; and
    generating the depth map based on the selected view and the set of points, wherein the depth map includes the one or more representations.

5. The method of claim 4, wherein the images of the wearable item include a plurality of viewpoints of the wearable item.

6. The method of claim 4, wherein selecting the view from the plurality of views using the set of points comprises:
    determining an orientation of a synthetic camera relative to the set of points that includes at least a threshold number of representations; and
    generating the view based on the determined orientation and a field of view of the synthetic camera.

7. The method of claim 4, wherein selecting the view from the plurality of views using the set of points comprises:
    determining an orientation, of a plurality of orientations, of a synthetic camera relative to the set of points that includes a largest number of representations; and
    generating the view based on the determined orientation and a field of view of the synthetic camera.

8. The method of claim 4, further comprising:
    capturing, via a plurality of cameras, the images of the wearable item, wherein the captured images include at least one of the markers.

9. The method of claim 8, wherein the plurality of cameras each have a different field of view than any of the plurality of views.

10. The method of claim 1, wherein the neural network is a convolutional neural network.

11. The method of claim 1, wherein the wearable item is a glove.

12. A non-transitory computer readable medium configured to store program code instructions, when executed by a processor, cause the processor to perform steps comprising:
    mapping of labels, via a neural network, to one or more representations in a depth map using a model of a portion of a body that wears a wearable item, wherein the wearable item includes the markers and the representations in the depth model are of the markers;
    determining a joint parameter using the mapped labels; and
    updating the model with the joint parameter, wherein content provided to a user of the wearable item is based in part on the updated model.

13. The computer readable medium of claim 12, wherein the mapping of labels, via the neural network, to one or more representations in the depth map using the model, further comprises:
    mapping positions of joints described in the model to image space positions using the neural network;
    matching the image space positions of the joints to image space positions of the markers; and
    labeling the matched positions of the joints.

14. The computer readable medium of claim 13, wherein the matching the image space positions of the joints to image space positions of the markers is done using minimum-cost bipartite matching.

15. The computer readable medium of 12, the steps further comprising:
    converting images to a set of points in 3D space, wherein the images are of the wearable item, and the set of points in 3D space include representations of the markers;
    selecting a view from a plurality of views using the set of points, wherein the selected view includes one or more representations of the representations; and
    generating the depth map based on the selected view and the set of points, wherein the depth map includes the one or more representations.

16. The computer readable medium of 15, wherein the images of the wearable item include a plurality of viewpoints of the wearable item.

17. The computer readable medium of 15, wherein selecting the view from the plurality of views using the set of points comprises:
   determining an orientation of a synthetic camera relative to the set of points that includes at least a threshold number of representations; and
   generating the view based on the determined orientation and a field of view of the synthetic camera.

18. The computer readable medium of 15, wherein selecting the view from the plurality of views using the set of points comprises:
   determining an orientation, of a plurality of orientations, of a synthetic camera relative to the set of points that includes a largest number of representations; and
   generating the view based on the determined orientation and a field of view of the synthetic camera.

19. The computer readable medium of 15, the steps further comprising:
   capturing, via a plurality of cameras, the images of the wearable item, wherein the captured images include at least one of the markers.

20. The computer readable medium of 19, wherein the plurality of cameras each have a different field of view than any of the plurality of views.

\* \* \* \* \*

UNITED STATES PATENT AND TRADEMARK OFFICE
CERTIFICATE OF CORRECTION

PATENT NO. : 10,657,704 B1
APPLICATION NO. : 16/781575
DATED : May 19, 2020
INVENTOR(S) : Han et al.

Page 1 of 1

It is certified that error appears in the above-identified patent and that said Letters Patent is hereby corrected as shown below:

In the Claims

In Column 16, in Claim 15, Line 56, delete "12," and insert -- claim 12, --, therefor.

In Column 17, in Claim 16, Line 1, delete "15," and insert -- claim 15, --, therefor.

In Column 17, in Claim 17, Line 4, delete "15," and insert -- claim 15, --, therefor.

In Column 17, in Claim 18, Line 12, delete "15," and insert -- claim 15, --, therefor.

In Column 17, in Claim 19, Line 20, delete "15," and insert -- claim 15, --, therefor.

In Column 17, in Claim 20, Line 25, delete "19," and insert -- claim 19, --, therefor.

Signed and Sealed this
Twenty-fourth Day of November, 2020

Andrei Iancu
*Director of the United States Patent and Trademark Office*